United States Patent [19]

Kato

[11] Patent Number: 5,153,917
[45] Date of Patent: Oct. 6, 1992

[54] COMMUNICATION TERMINAL SYSTEM

[75] Inventor: Yoshibumi Kato, Nagoya, Japan

[73] Assignee: Brother Kogyo Kabushiki Kaisha, Japan

[21] Appl. No.: 650,602

[22] Filed: Feb. 5, 1991

[30] Foreign Application Priority Data

Feb. 14, 1990 [JP] Japan .................................. 2-33470

[51] Int. Cl.$^5$ .............................................. H01K 9/00
[52] U.S. Cl. ............................................. 380/3; 380/4
[58] Field of Search ........................................ 380/3, 4

[56] References Cited

U.S. PATENT DOCUMENTS

| | | | |
|---|---|---|---|
| 4,937,862 | 6/1990 | Kosich | 380/3 |
| 4,941,175 | 6/1990 | Enescu et al. | 380/4 |
| 5,032,979 | 7/1991 | Hecht et al. | 380/4 |

Primary Examiner—Thomas H. Tarcza
Assistant Examiner—David Cain
Attorney, Agent, or Firm—Oliff & Berridge

[57] ABSTRACT

The invention provides an improved communication terminal system which basically works only in an on-line state, that is, when it is connected with a host computer; but, which is also workable for a pre-determined time period even in an off-line state. The communication terminal system includes a terminal unit, measuring means for counting working frequency or time of the terminal unit, and control means for detecting disconnection from the host computer and controlling the terminal unit. The control means activates the counting means when it detects disconnection of the communication lines. The control means then disables the terminal unit when it detects that working frequency or time of the terminal unit amounts to a value previously set on the measuring means.

24 Claims, 6 Drawing Sheets

COMMUNICATION TERMINAL SYSTEM

BACKGROUND OF THE INVENTION

The present invention relates to a communication terminal system.

Communication terminal units such as business use 'karaoke' units (units for generating musical accompaniment, i.e., the instrumental part without voice, to which people enjoy singing songs) and vending machines for copying software or programs for personal use are generally connected to a host computer through communication lines. Such units are useful and advantageous. Sitting in the office, i.e., without going to the actual location thereof, owners of the units or machines can efficiently manage sales data for each hour, each day, or each week, and quickly and effectively deal with any troubles or problems occurring in the terminal units. Furthermore, when the unit is moved in an abnormal way and disconnected from the host computer, signals are sent to the host computer to tell that something abnormal or unusual has happened. Some units are even programmed to work only in an on-line state, i.e. the units are useless in an off-line state. This function is very practical since it discourages thieves and burglars.

The above conventional units, however, still have a problem; that is, they can only inform the host computer of abnormality such as theft. When business use 'karaoke' units or vending machines for copying software or programs are stolen, not only direct damage but a large amount of secondary damage can be expected. Examples of the secondary damage include unrecoverable royalty for music pieces stored in the 'karaoke' units and numerous unqualified copies of the software or programs stolen. The communication terminal units programmed to work only in on-line state cause another problem; while the host computer or the communication lines are down, the terminal units do not work at all.

Wherefore, one object of this invention is to provide an improved communication terminal system, which is applicable to 'karaoke' units or vending machines for copying software or programs for personal use.

Another object of the invention is to provide a communication terminal system which basically works only in an on-line state; but, which is workable for a pre-determined time period even in an off-line state caused by, for example, inoperability of a host computer or communication lines connected thereto.

Other objects and benefits of the invention will become apparent from the detailed description which follows hereinafter when taken in conjunction with the drawing figures which accompany it.

SUMMARY

The above and other related objectives are realized by a communication terminal system which communicates with a host computer at a regular interval and is monitored in use by the host computer through communication lines. The communication terminal system includes a terminal unit, measuring means for counting working frequency or time of the terminal unit, and control means for detecting disconnection from the host computer and controlling the terminal unit. The control means activates the counting means when it detects disconnection of the communication lines. The control means then disables the terminal unit when it detects that working frequency or time of the terminal unit amounts to a value previously set on the measuring means.

The terminal unit performs normal operations in normal or on-line state. When the terminal unit is disconnected from the host computer for one reason or another, the control means detects the disconnection and the measuring means starts counting. The control means disables the terminal unit when working frequency or time of the terminal unit reaches a value previously set on the measuring means.

DESCRIPTION OF THE DRAWINGS

The invention may be best understood by referring to the following detailed description of the preferred embodiments and the accompanying drawings, wherein like numerals denote like elements and in which.

DESCRIPTION OF THE PREFERRED EMBODIMENT

Several preferred embodiments of the invention will now be explained in detail with reference to the drawings. Since there may be many modifications without departing from the scope and spirit of the invention, the embodiments below are not intended to limit the invention to the specific embodiments; but, are intended only to illustrate the invention more clearly.

Figure 1:
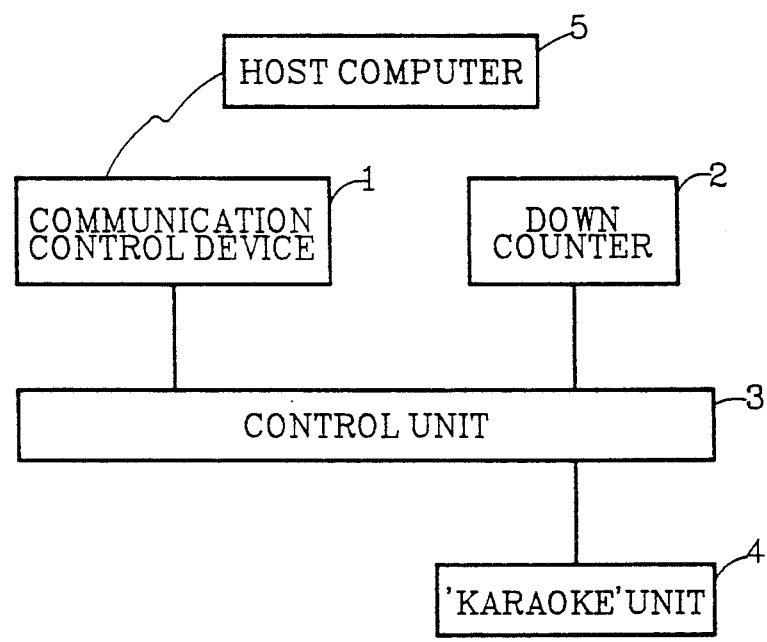
FIG. 1 is a block diagram illustrating a first embodiment of the invention.
Figure 4:
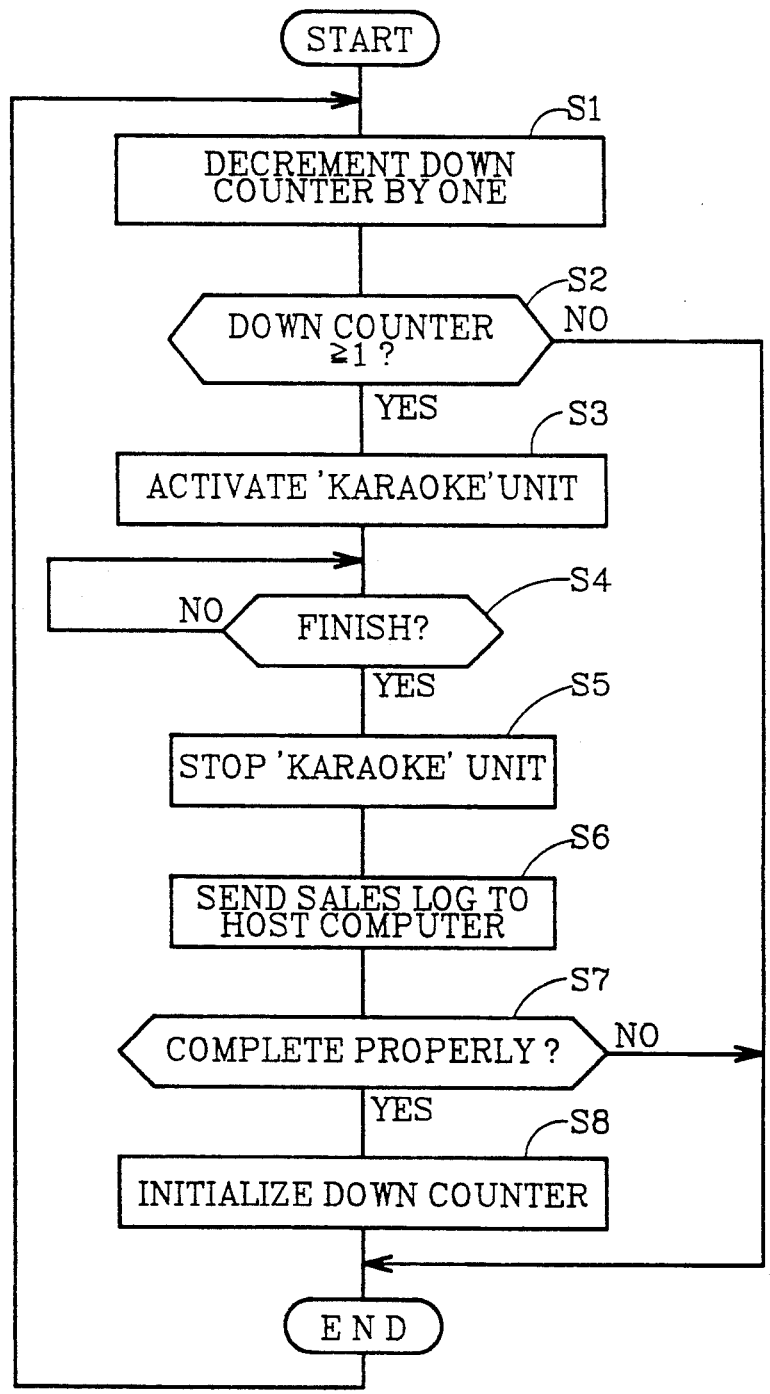
FIG. 4 is a flow chart showing the working process of the first embodiment of FIG. 1.

FIG. 1 shows a first embodiment, a 'karaoke' terminal system, to which the communication terminal system of the invention is applied. The 'karaoke' terminal system includes a communication control device 1 for controlling communication with a host computer 5, a down counter 2, a control unit 3, and a 'karaoke' unit 4 for reproducing music pieces. The communication control device 1, the down counter 2, and the 'karaoke' unit 4 are all connected to the control unit 3. The working process of the 'karaoke' terminal system of the first embodiment is explained according to the flowchart of FIG. 4. When the main power of the 'karaoke' terminal system is turned on, the control unit 3 decrements the value on the down counter 2 by one at step S1. The control unit 3 then compares the value on the down counter 2 with one at step S2. When the value is not less than one, the 'karaoke' unit 4 is activated to reproduce a piece of music at step S3. When the value is less than one, the 'karaoke' unit 4 is not activated and the program exits from the routine. At step S4, the control unit 3 determines if reproduction of a piece of music is completed. When the answer is YES at step S4, power to the 'karaoke' unit 4 is cut at step S5 and a sales log is transmitted to the host computer 5 through the communication control device 1 at step S6. The control unit 3 checks if the sales log is properly transmitted to the host computer 5 at step S7, and then initializes the down counter 2 to a pre-determined value, e.g., ten, at step S8. Then, the program exits from the routine. When the sales log is not transmitted properly, the down counter 2 is not initialized and the program returns to step S1 at which the value on the down counter 2 is decremented by one.

The 'karaoke' unit 4 is workable until the value on the down counter 2 becomes less than one, even when the 'karaoke' terminal system is disconnected from the host computer 5 due to troubles on communication lines or the host computer 5 being down. For example, when the pre-determined initial value on the down counter 2 is ten, the 'karaoke' unit 4 can reproduce ten pieces of music in an off-line state. In other words, when something abnormal or unusual, e.g., cut-off of the communication lines or theft of the 'karaoke' unit 4 happens, the 'karaoke' unit 4 works only ten times.

Figure 2:
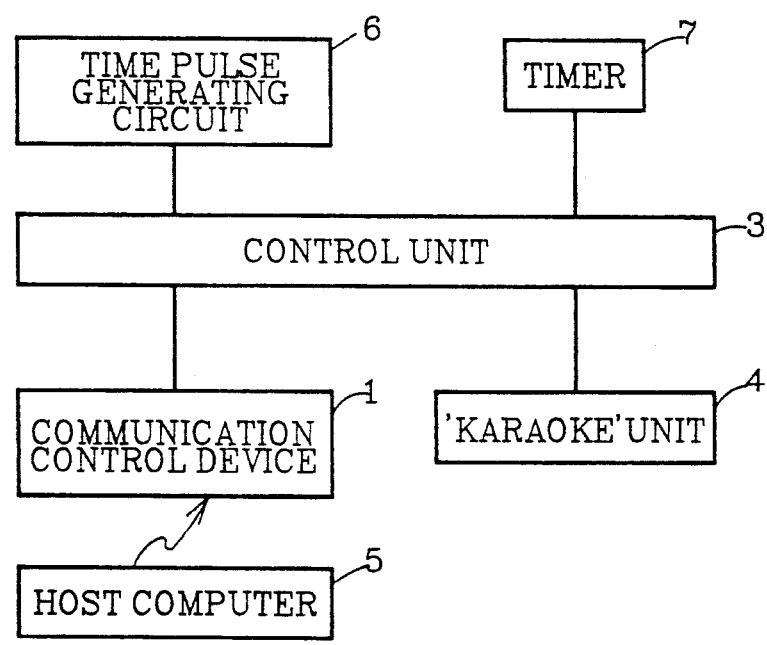
FIG. 2 is a block diagram illustrating a second embodiment of the invention.
Figure 5:
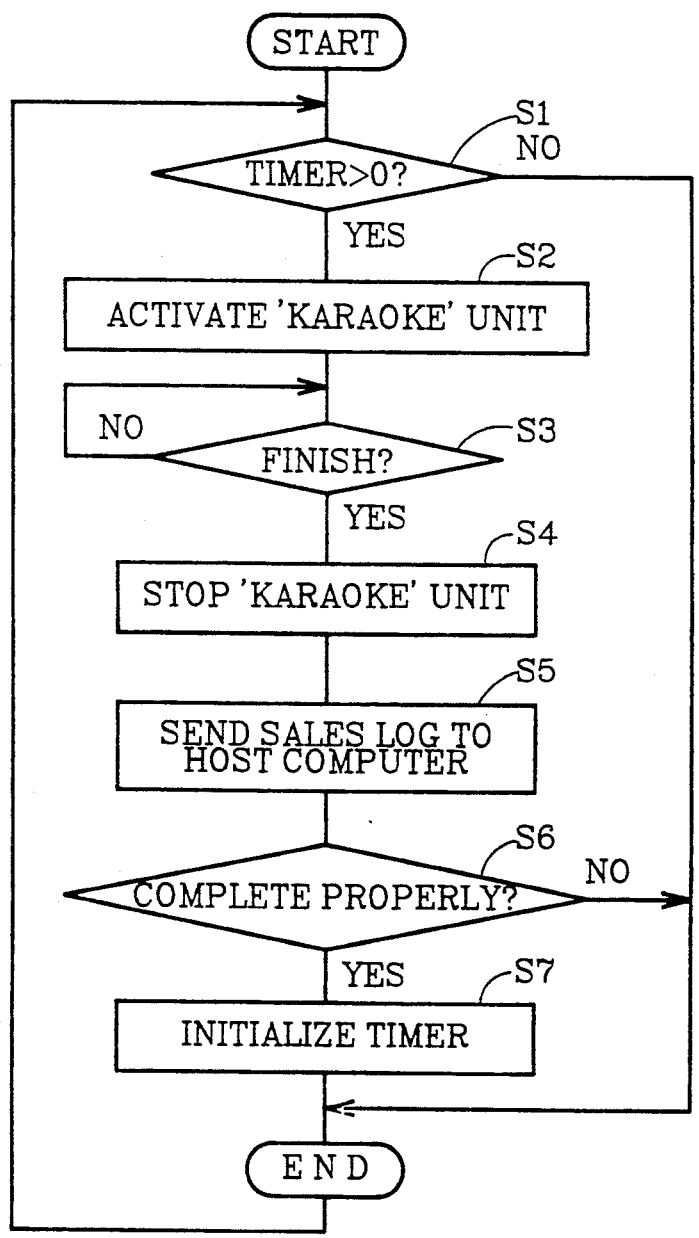
FIG. 5 is a flow chart showing the working process of the second embodiment of FIG. 2.

A second embodiment of the invention, a 'karaoke' terminal system, is explained according to FIGS. 2 and 5. In FIG. 2, the same numerals denote the same elements as FIG. 1. The difference from the first embodiment is that a timer 7, in place of the down counter 2 of FIG. 1, is connected to a control unit 3, and a time pulse generating circuit 6 is further connected to the timer 7. The working process of the 'karaoke' terminal system of the second embodiment is based on the flowchart of FIG. 5. When the main power of the 'karaoke' terminal system is turned on, the control unit 3 compares the value on the timer 7 with zero at step S1. When the value is greater than zero, a 'karaoke' unit 4 is activated to reproduce a piece of music at step S2. When the value is not greater than zero, the 'karaoke' unit 4 is not activated and the program exits from the routine. At step S3, the control unit 3 determines if reproduction of a piece of music is completed. When the answer is YES at step S3, power to the 'karaoke' unit 4 is cut at step S4 and a sales log is transmitted to a host computer 5 through a communication control device 1 at step S5. The control unit 3 checks if the sales log is properly transmitted to the host computer 5 at step S6, and then initializes the timer 7 to a pre-determined value, e.g., 100 hours, at step S7. Then the program exits from the routine. When the sales log is not transmitted properly, the timer 7 is not initialized and the program returns to step S1 at which the value on the timer 7 is compared with zero. In the second embodiment, the timer 7 does not stop counting; but, works all the time corresponding to reference signals sent from the time pulse generating circuit 6.

The 'karaoke' unit 4 is workable until the value on the timer 7 becomes not greater than zero, even when the 'karaoke' terminal system 4 is disconnected from the host computer 5 due to troubles on communication lines or the host computer 5 being down. For example, when the pre-determined initial value on the timer 7 is 100, the 'karaoke' unit 4 can work for 100 hours in an off-line state. In other words, when something abnormal or unusual, e.g., cut-off of the communication lines or theft of the 'karaoke' unit 4 happens, the 'karaoke' unit 4 works only 100 hours.

Figure 3:
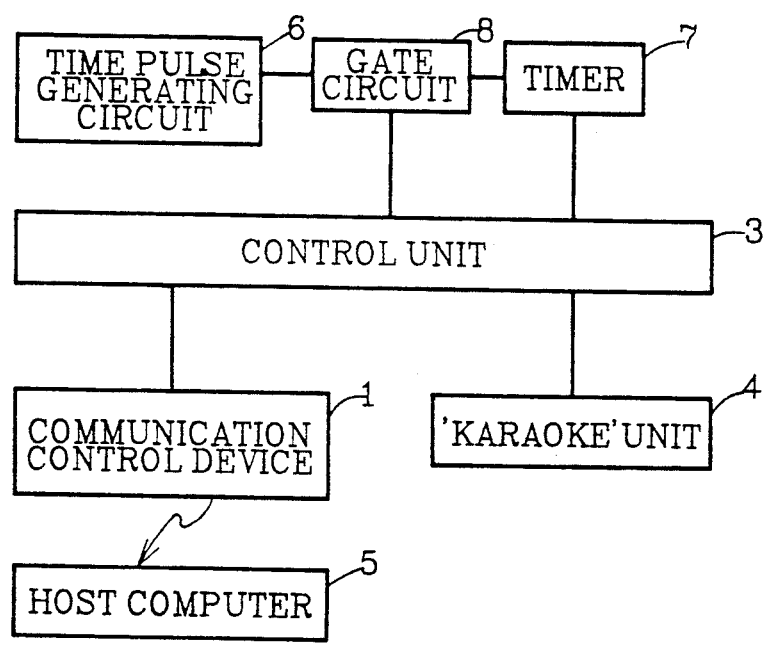
FIG. 3 is a block diagram illustrating a third embodiment of the invention.
Figure 6:
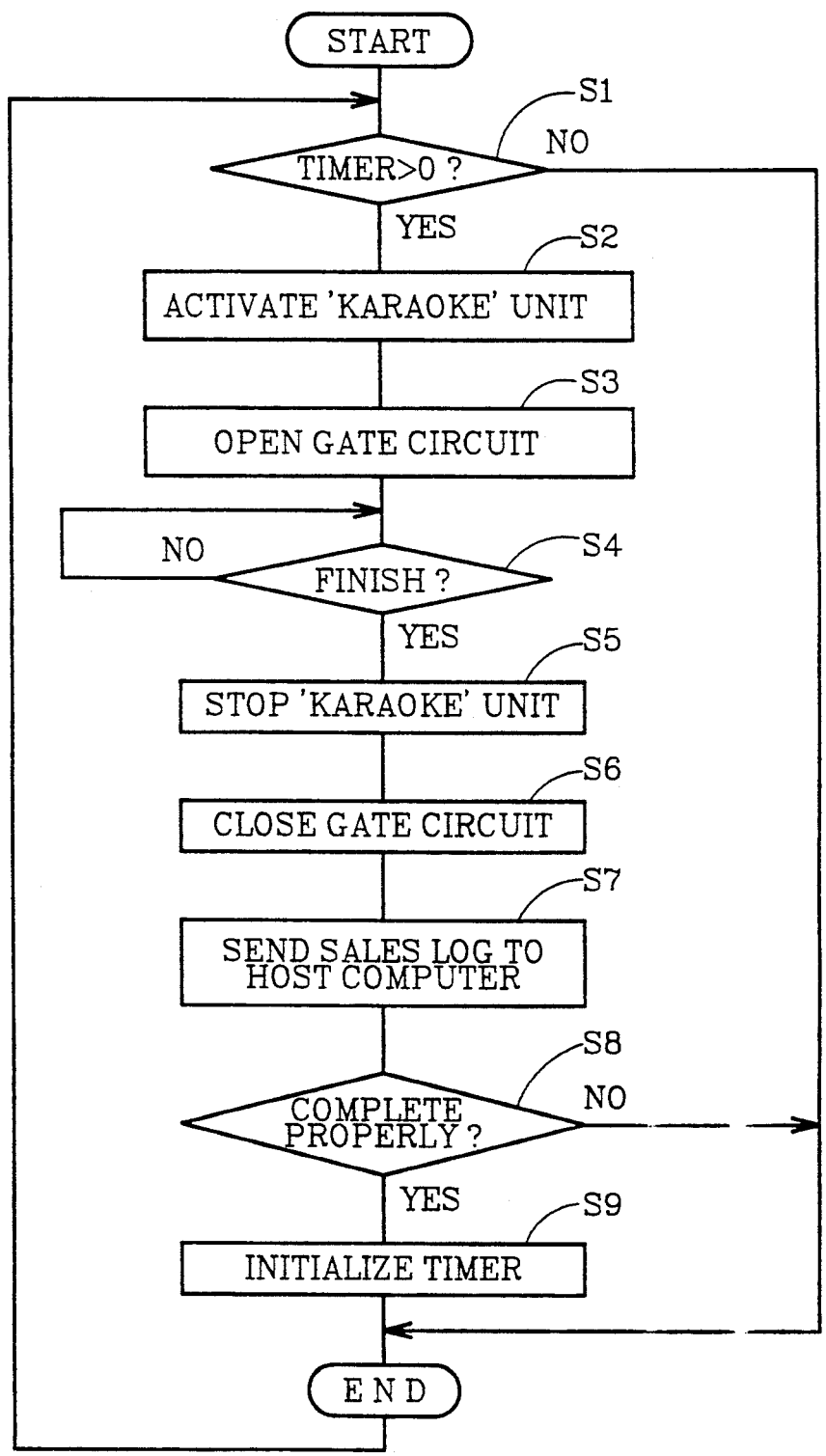
FIG. 6 is a flow chart showing the working process of the third embodiment of FIG. 3.

A third embodiment of the invention, a 'karaoke' terminal system, is explained according to FIGS. 3 and 6. In FIG. 3, the same numerals denote the same elements as FIG. 2. The difference from the second embodiment is that a gate circuit 8 is provided between a timer 7 and a time pulse generating circuit 6 and is further connected to a control unit 3. The working process of the 'karaoke' terminal system of the third embodiment is explained based on the flowchart of FIG. 6. When the main power of the 'karaoke' terminal system is turned on, the control unit 3 compares the value on the timer 7 with zero at step S1. When the value is greater than zero, the 'karaoke' unit 4 is activated to reproduce a piece of music at step S2. When the value is not greater than zero, the 'karaoke' unit 4 is not activated and the program exits from the routine. The control unit 3 opens the gate circuit 8 at step S3 so that the timer pulse generating circuit 6 starts transmitting reference pulses to the timer 7. At step S4, the control unit 3 determines if reproduction of a piece of music is completed. When the answer is YES at step S4, the control unit 3 cuts power to the 'karaoke' unit 4 at step S5 and closes the gate circuit 8 to stop the timer 7 at step S6. At step S7, a sales log is transmitted to a host computer 5 through a communication control device 1. The control unit 3 checks if the sales log is properly transmitted to the host computer 5 at step S8 and then initializes the timer 7 to a pre-determined value, e.g., ten hours, at step S9. Then the program exits from the routine. When the sales log is not transmitted properly, the timer 7 is not initialized and the program returns to step S1 at which the value on the timer 7 is compared with zero.

The 'karaoke' unit 4 is workable until the value on the timer 7 becomes not greater than zero, even when the 'karaoke' terminal system is disconnected from the host computer 5 due to troubles on communication lines or the host computer 5 being down. For example, when the pre-determined initial value on the timer 7 is ten, the 'karaoke' unit 4 can work for ten hours in an off-line state. In other words, when something abnormal or unusual, e.g., cut-off of the communication lines or theft of the 'karaoke' unit 4, the 'karaoke' unit 4 works only ten hours.

As already described above, the communication terminal system of the invention basically works only in an on-line state. This function is effective for discouraging thieves and burglars. On the other hand, the terminal unit is workable for a pre-determined time period even in an off-line state. This function is effective when the communication terminal system is disconnected from the host computer due to the host computer being down or the communication lines.

Wherefore, having thus described the present invention, what is claimed is:

1. A communication terminal system which communicates with a host computer at a regular interval and is monitored by the host computer through communication lines, said communication terminal system comprising:
   a) a terminal unit;
   b) measuring means for measuring a period of continued operation of said terminal unit; and,
   c) control means for detecting disconnection of the terminal unit from the host computer and for controlling said terminal unit, said control means including means for activating said measuring means when said control means detects one of two conditions, one condition being disconnection of the communication lines to the host computer and the other condition being a lack of a response from the host computer, said control means disabling said terminal unit when the period of continued operation of said terminal unit reaches a pre-set value in said measuring means.

2. The communication terminal system as claimed in claim 1 wherein:
   said measuring means comprises a down counter.

3. The communication terminal system as claimed in claim 1 wherein:

said measuring means comprises a timer and a time pulse generating circuit.

4. The communication terminal system as claimed in claim 3 and further comprising:

a gate circuit disposed between said timer and said time pulse generating circuit.

5. In a communication terminal system having a terminal unit which communicates with a host computer at regular intervals and is monitored by the host computer through communication lines connected between the terminal unit and the host computer, the improvement for allowing temporary off-line use while still discouraging theft of the terminal unit comprising:

a) measuring means for measuring a period of continued operation of the terminal unit; and,
b) control means for detecting disconnection of the terminal unit from the host computer and for controlling the terminal unit, said control means including means for activating said measuring means when said control means detects one of two conditions, one condition being disconnection of the communication lines to the host computer and the other condition being a lack of a response from the host computer, said control means disabling the terminal unit when the period of continued operation of the terminal unit reaches a pre-set value in said measuring means.

6. The communication terminal system as claimed in claim 5 wherein:

said measuring means comprises a down counter.

7. The communication terminal system as claimed in claim 5 wherein:

said measuring means comprises a timer and a time pulse generating circuit.

8. The communication terminal system as claimed in claim 7 and further comprising:

a gate circuit disposed between said timer and said time pulse generating circuit.

9. In a communication terminal system having a terminal unit which communicates with a host computer at regular intervals and is monitored by the host computer through communication lines connected between the terminal unit and the host computer, the improvement for allowing temporary off-line use while still discouraging theft of the terminal unit comprising:

a) measuring means for measuring an indicator of continued operation of the terminal unit; and,
b) control means connected to the terminal unit for activating said measuring means when said control means detects one of two conditions, one condition being disconnection of the communication lines to the host computer and the other condition being a lack of a response from the host computer, said control means disabling the terminal unit when said indicator of continued operation reaches a pre-set value in said measuring means.

10. The communication terminal system as claimed in claim 9 wherein:

said measuring means comprises means for measuring frequency of continued operation of the terminal unit.

11. The communication terminal system as claimed in claim 10 wherein:

said means for measuring frequency of continued operation of the terminal unit comprises a down counter.

12. The communication terminal system as claimed in claim 9 wherein:

said measuring means comprises means for measuring time of continued operation terminal unit.

13. The communication terminal system as claimed in claim 12 wherein:

said means for measuring time of continued operation of the terminal unit comprises a timer and a time pulse generating circuit.

14. The communication terminal system as claimed in claim 13 and further comprising:

a gate circuit disposed between said timer and said time pulse generating circuit.

15. Theft-deterring apparatus for use in a communication terminal system having a terminal unit which communicates with a host computer at regular intervals and is monitored by the host computer through communication lines connected between the terminal unit and the host computer, said theft-deterring apparatus comprising:

a) measuring means for measuring an indicator of continued operation of the terminal unit;
b) resetting means for resetting said measuring means to a beginning value when the communication lines and the host computer are working and communicating with the terminal unit; and,
c) control means connected to the terminal unit for monitoring said indicator of continued operation when said control means detects one of two conditions, one condition being disconnection of the communication lines to the host computer and the other condition being a lack of a response from the host computer, said control means disabling the terminal unit when said indicator of continued operation reaches a pre-set amount from said beginning value.

16. The theft-deterring apparatus claimed in claim 15 wherein:

said indicator of continued operation comprises frequency of use of the terminal unit.

17. The theft-deterring apparatus claimed in claim 16 wherein:

said measuring means measures frequency of use of the terminal unit and comprises a down counter.

18. The theft-deterring apparatus claimed in claim 15 wherein:

said indicator of continued operation comprises time of continued operation of the terminal unit.

19. The theft-deterring apparatus claimed in claim 18 wherein:

said measuring means measures time of continued operation of the terminal unit and comprises a timer and a time pulse generating circuit.

20. The theft-deterring apparatus claimed in claim 19 and further comprising:

a gate circuit disposed between said timer and said time pulse generating circuit.

21. The communication terminal system as claimed in claim 1, wherein the pre-set value is zero.

22. The communication terminal system as claimed in claim 5, wherein the pre-set value is zero.

23. The communication terminal system as claimed in claim 9, wherein the pre-set value is zero.

24. The communication terminal system as claimed in claim 15, wherein the pre-set value is zero.

* * * * *